Nov. 4, 1952 J. VAN SLOOTEN 2,616,968

CIRCUIT ARRANGEMENT FOR LIMITING THE AMPLITUDE OF AN ELECTRICAL OSCILLATION

Filed Feb. 8, 1947

INVENTOR.
JACOB VAN SLOOTEN.
BY Fred M Vogel
AGENT.

Patented Nov. 4, 1952 2,616,968

UNITED STATES PATENT OFFICE 2,616,968

CIRCUIT-ARRANGEMENT FOR LIMITING THE AMPLITUDE OF AN ELECTRICAL OSCILLATION

Jacob van Slooten, Eindhoven, Netherlands, assignor to Hartford National Bank and Trust Company, Hartford, Conn., as trustee Application February 8, 1947, Serial No. 727,443
In the Netherlands March 11, 1944

Section 1, Public Law 690, August 8, 1946
Patent expires March 11, 1964

3 Claims. (Cl. 178—44)

For limiting the amplitude of electrical oscillations use is mostly made of a negatively biased diode which is connected in parallel with an impedance to which the oscillations to be limited are supplied from a source of potential. As long as the momentary value of the amplitude of the voltage set up across the impedance is smaller than the negative bias no current flows through the diode and the voltage across the impedance is proportional to the voltage of the source of potential. However, as soon as the momentary value of the voltage across the impedance exceeds the negative bias, the diode becomes conducting and the voltage across the impedance, with an increase in voltage of the source of potential, increases less rapidly than before.

Sometimes this circuit-arrangement is not suitable, for instance in receivers for frequency-modulated oscillations, since it does not permit the amplitude of the oscillation to be limited to be kept constant with the required accuracy, which is due to the fact that the diode, as soon as it becomes conducting, does not have an infinitely small internal resistance.

The invention has for its object to provide a circuit-arrangement yielding a much better limitation than the conventional circuit. This object is achieved by feeding the oscillations to be limited through an impedance inverting network to the series-connection of a diode and an impedance element exhibiting a high value in regard to the amplitude variations of the oscillations to be limited and exhibiting low value in regard to the electrical oscillation itself, the limited voltage being taken from the input terminals of the inverting network. In the present case, the expression "reciprocal network" is to be understood to mean a network whose input impedance is inversely proportional to the impedance connected between the output terminals.

Figure 1:
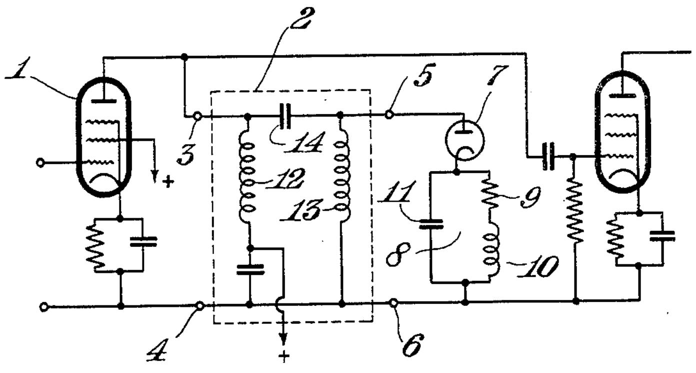
Figure 2:
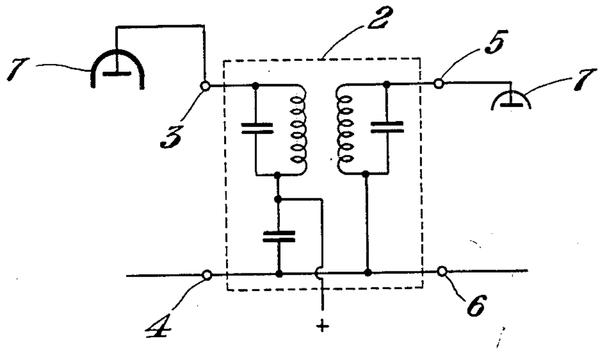

Fig. 1 of the drawing represents a form of construction of the circuit-arrangement according to the invention for limiting a frequency-modulated oscillation. Figure 2 is a second preferred embodiment of the invention.

The frequency-modulated oscillation is supplied to the control-grid circuit of an intermediate-frequency amplifying tube 1. The anode circuit of this tube comprises the circuit according to the invention, as a result of which undesirable amplitude-modulations of the oscillation are suppressed. This circuit consists of an impedance inverting network 2 having input terminals 3, 4 and output terminals 5, 6 and a series-connection of a diode 7 and an impedance 8, which is connected between the last-mentioned terminals. This impedance, which consists of a resistance 9, a choke 10 and a condenser 11 has such a value that on the occurrence of amplitude variations of the frequency-modulated oscillation the voltage across the diode 7 does not change appreciably and the total voltage variation takes place across the impedance 8. Since the amplitude variations have a low-frequency character this is ensured if the impedance 8 in regard to low-frequency oscillations is high relatively to the internal resistance of the diode. For a conventional diode a choke 10 of from 10 to 100 henries and a resistance 9 of several thousands of ohms is sufficient. The condenser 11 should have such a size as to form practically a short-circuit in regard to the frequency-modulated oscillation. When the impedance 8 is properly chosen the current in the diode 7 will remain substantially constant on the occurrence of a variation of the amplitude of the voltage appearing across the series-connection of the diode 7 and the impedance 8, in other words the series-connection behaves as a very high impedance $Z_u$ in regard to amplitude variations of the voltage supplied. Consequently, for limiting the voltage in the output circuit of tube 1 the series-connection alone is not serviceable, because this requires an impedance which is very low in regard to amplitude variations. Transformation of the very high impedance into a very low impedance takes place through the impedance inverting network 2. This consists of two coils 12 and 13 which in the simplest case have the same inductance L and a condenser 14 having a capacity C. The impedance $Z_i$ between the input terminals 3, 4, if $$\omega^2=\frac{1}{LC}$$

in regard to the frequency $\varpi$ of the oscillations to be limited, amounts to $$Z_i=\frac{L/C}{Z_u}$$

and is consequently inversely proportional to the output impedance $Z_u$ formed by the series-connection of the diode 7 and the impedance 8. If this impedance $Z_u$, as appears from what has been said above, is very high, then $Z_i$ is consequently very low. Hence, no appreciable variations of the voltage can occur between the input terminals 3, 4 of the network, so that a suitable limitation of the output voltage of the amplifying tube 1 is obtained. Furthermore, the limiting effect will be better as L/C is smaller, so that L should be as low and C as high as possible. On the other hand the ratio L/C should not be given too low a value, since in this case the input impedance of the network would acquire too low a value in regard to the frequency-modulated oscillation, due to which the amplification of the circuit would be low. The optimum value of L/C will be the value at which the input impedance in regard to the amplitude variations is as low as possible with a not too low value for the frequency-modulated oscillation itself.

For the impedance inversing network represented in the drawing networks having a different composition may be substituted. In practice a band-pass filter will usually be preferred, which, as shown in Fig. 2, consists of two coupled resonant circuits that are preferably coupled hypercritically.

The circuit-arrangement set out above limits the voltage during one half phase. If both phases are to be limited the circuit-arrangement should be of the push-pull kind. In this case it is not necessary to use two impedance inversing networks. It is sufficient to connect two push-pull connected diodes to the output terminals of one and the same impedance inversing network.

What I claim is:

1. In electrical circuit arrangement for limiting the amplitude variations of a given frequency range from an electrical oscillation having a frequency greater than the maximum frequency of said range, comprising an impedance inverting network having input and output terminals, means to apply said oscillation to said input terminals, a series circuit comprising a unidirectional conductor and an element having a high impedance value in said given range and a low impedance value at the frequency of said oscillation, means to connect said series circuit to said output terminals, and means coupled to said input terminals to derive therefrom an electrical oscillation having a substantially constant amplitude value.

2. An electrical circuit arrangement for limiting the amplitude variations of a given frequency range from an electrical oscillation having a frequency greater than the maximum frequency of said range, comprising an impedance inverting network having input and output terminals, said impedance inverting network comprising a band-pass filter including two hypercritically coupled resonant circuits, means to apply said oscillation to said input terminals, a series circuit comprising a unidirectional conductor and an element having a high impedance value in said given range and a low impedance value at the frequency of said oscillation, means to connect said series circuit to said output terminals, and means coupled to said input terminals to derive therefrom an electrical oscillation having a substantially constant amplitude value.

3. An electrical circuit arrangement for limiting the amplitude variations of a given frequency range from an electrical oscillation having a frequency greater than the maximum frequency of said range, comprising an impedance inverting network having input and output terminals, said impedance inverting network comprising a band-pass filter including two critically coupled resonant circuits, means to apply said oscillation to said input terminals, a series circuit comprising a unidirectional conductor, a choke having a high impedance value in said given range and a capacitive element having a high impedance value in said given range and a low impedance value at the frequency of said oscillation connected in parallel with said choke, means to connect said series circuit to said output terminals, and means coupled to said input terminals to derive therefrom an electrical oscillation having a substantially constant amplitude value.

JACOB VAN SLOOTEN.

REFERENCES CITED

The following references are of record in the file of this patent:

UNITED STATES PATENTS

| Number | Name | Date |
|---|---|---|
| 2,115,694 | Braden | Apr. 26, 1938 |
| 2,175,335 | Andrieu | Oct. 10, 1939 |
| 2,263,165 | Dallos | Nov. 18, 1941 |
| 2,405,845 | Pfaff | Aug. 13, 1946 |

FOREIGN PATENTS

| Number | Country | Date |
|---|---|---|
| 118,548 | Australia | Nov. 30, 1942 |